United States Patent
Carlson et al.

(10) Patent No.: US 11,819,714 B2
(45) Date of Patent: *Nov. 21, 2023

(54) FALL-PROTECTION SYSTEM WITH MONITORING SYSTEM

(71) Applicant: 3M INNOVATIVE PROPERTIES COMPANY, St. Paul, MN (US)

(72) Inventors: Lauren K. Carlson, St. Paul, MN (US); Scott E. Brigham, Maplewood, MN (US); Christopher W. Coyle, Eagan, MN (US); Heidi Lopez-Hidalgo, South St. Paul, MN (US); Jonathan J. Lepp, Eagan, MN (US); Stephen D. Shaver, Cottage Grove, MN (US); Jeffrey T. Keacher, Denver, CO (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/121,815

(22) Filed: Mar. 15, 2023

(65) Prior Publication Data

US 2023/0218934 A1 Jul. 13, 2023

Related U.S. Application Data

(63) Continuation of application No. 17/435,661, filed as application No. PCT/IB2020/052398 on Mar. 16, 2020, now Pat. No. 11,633,632.

(Continued)

(51) Int. Cl.
*A62B 35/00* (2006.01)
*G08B 21/02* (2006.01)
(Continued)

(52) U.S. Cl.
CPC ...... *A62B 35/0025* (2013.01); *A62B 35/0037* (2013.01); *A62B 35/0068* (2013.01);
(Continued)

(58) Field of Classification Search
CPC ...... G08B 21/02; G08B 7/06; A62B 35/0025; A62B 35/0037; A62B 35/0068;
(Continued)

(56) References Cited

U.S. PATENT DOCUMENTS 6,265,983 B1 7/2001 Baillargeon
6,297,744 B1 10/2001 Baillargeon et al.
(Continued)

FOREIGN PATENT DOCUMENTS

CA 2930018 A1 11/2016
CA 3013742 A1 2/2019
(Continued)

OTHER PUBLICATIONS

"V-Tec io1 Self-retracting lifeline", V-Tec, 2 pages, [retrieved on the internet on Oct. 28, 2021], URL <https://us.msasafety.com/Fall-Protection/Self-Retracting-Lanyards/V-TEC%C2%AE-io1/p/000460000400011005?locale=en.>, 2pages.
(Continued)

*Primary Examiner* — Brian Wilson
(74) *Attorney, Agent, or Firm* — Kenneth B. Wood

(57) ABSTRACT

A fall-protection system including a harness and a fall-protection apparatus with a lifeline bearing a connector configured to be connected to the harness; and, a fall-protection monitoring system with a base unit and with at least one sensor module configured to sense a condition of the connector and to communicate a signal indicative of the condition of the connector to the base unit.

21 Claims, 4 Drawing Sheets

Related U.S. Application Data

(60) Provisional application No. 62/978,024, filed on Feb. 18, 2020, provisional application No. 62/822,457, filed on Mar. 22, 2019.

(51) Int. Cl.
   *B66F 17/00* (2006.01)
   *G08B 7/06* (2006.01)

(52) U.S. Cl.
   CPC ...... *A62B 35/0075* (2013.01); *A62B 35/0093* (2013.01); *B66F 17/006* (2013.01); *G08B 7/06* (2013.01); *G08B 21/02* (2013.01)

(58) Field of Classification Search
   CPC ............. A62B 35/0075; A62B 35/0093; B66F 17/003; B66F 17/006; B66F 11/04; F16P 3/08; F16P 3/147; F16P 3/145
   See application file for complete search history.

(56) References Cited

U.S. PATENT DOCUMENTS

| | | |
|---|---|---|
| 6,330,931 B1 | 12/2001 | Baillargeon et al. |
| 7,843,349 B2 | 11/2010 | Rohlf |
| 8,256,574 B2 | 9/2012 | Griffiths et al. |
| 8,430,206 B2 | 4/2013 | Griffiths et al. |
| 8,430,207 B2 | 4/2013 | Griffiths et al. |
| 9,480,866 B2 | 11/2016 | Pollard |
| 9,488,235 B2 | 11/2016 | Casebolt |
| 9,776,847 B2 | 10/2017 | Mondal et al. |
| 9,993,669 B2 | 6/2018 | Casebolt et al. |
| 9,998,804 B2 | 6/2018 | Awiszus et al. |
| 10,138,102 B2 | 11/2018 | Baillargeon et al. |
| 10,496,045 B2 | 12/2019 | Hu et al. |
| 2007/0074935 A1 | 4/2007 | Zahn |
| 2010/0231402 A1 | 9/2010 | Flynt et al. |
| 2011/0090079 A1* | 4/2011 | Morino ............... A62B 35/0075 340/532 |
| 2011/0168486 A1 | 7/2011 | Dobrovolsky |
| 2015/0027808 A1* | 1/2015 | Baillargeon ........ A62B 35/0025 182/19 |
| 2015/0122579 A1 | 5/2015 | Vance et al. |
| 2015/0284231 A1 | 10/2015 | Grant |
| 2016/0107007 A1* | 4/2016 | Pollard ............... A62B 35/0075 182/3 |
| 2017/0129753 A1 | 5/2017 | Kraimer et al. |
| 2017/0372216 A1 | 12/2017 | Awiszus et al. |
| 2019/0016768 A1 | 1/2019 | Chen et al. |
| 2020/0016439 A1 | 1/2020 | Perner et al. |
| 2020/0198952 A1 | 6/2020 | Lepoutre et al. |
| 2020/0222732 A1 | 7/2020 | Rutkowski et al. |
| 2021/0358282 A1* | 11/2021 | Lin .................... G08B 21/0461 |

FOREIGN PATENT DOCUMENTS

| | | |
|---|---|---|
| EP | 2314354 A2 | 4/2011 |
| EP | 3260172 A1 | 12/2017 |
| GB | 2510096 A | 7/2014 |
| JP | 2004018212 A | 1/2004 |
| KR | 10-1626856 B1 | 6/2016 |
| WO | 2000019052 A1 | 4/2000 |
| WO | 2018150299 A1 | 8/2018 |
| WO | 2018178780 A2 | 10/2018 |
| WO | 2019025345 A2 | 2/2019 |
| WO | 2019030708 A1 | 2/2019 |
| WO | 2019040409 A1 | 2/2019 |
| WO | 2019157007 A1 | 8/2019 |

OTHER PUBLICATIONS

International Search report for PCT International Application No. PCT/IB2020/052398 dated Aug. 19, 2020, 3 pages.

\* cited by examiner

FALL-PROTECTION SYSTEM WITH MONITORING SYSTEM

BACKGROUND

Aerial lifts are widely used for a variety of applications. In particular, so-called order pickers are motorized aerial lifts that are widely used for materials handling to pick items from vertical stacks, from shelves of various heights, and so on.

SUMMARY

In broad summary, herein is disclosed a fall-protection system comprising a harness and a fall-protection apparatus comprising a lifeline bearing a connector configured to be connected to the harness; and, a fall-protection monitoring system comprising a base unit and comprising at least one sensor module configured to sense a condition of the connector and to communicate a signal indicative of the condition of the connector to the base unit. The base unit may be configured to emit a first notification if a first signal is received from the sensor module indicative of a first condition of the connector, and to emit a second, different notification if a second, different signal is received from the sensor module indicative of a second, different condition of the connector. These and other aspects will be apparent from the detailed description below. In no event, however, should this broad summary be construed to limit the claimable subject matter, whether such subject matter is presented in claims in the application as initially filed or in claims that are amended or otherwise presented in prosecution.

Figure 1:
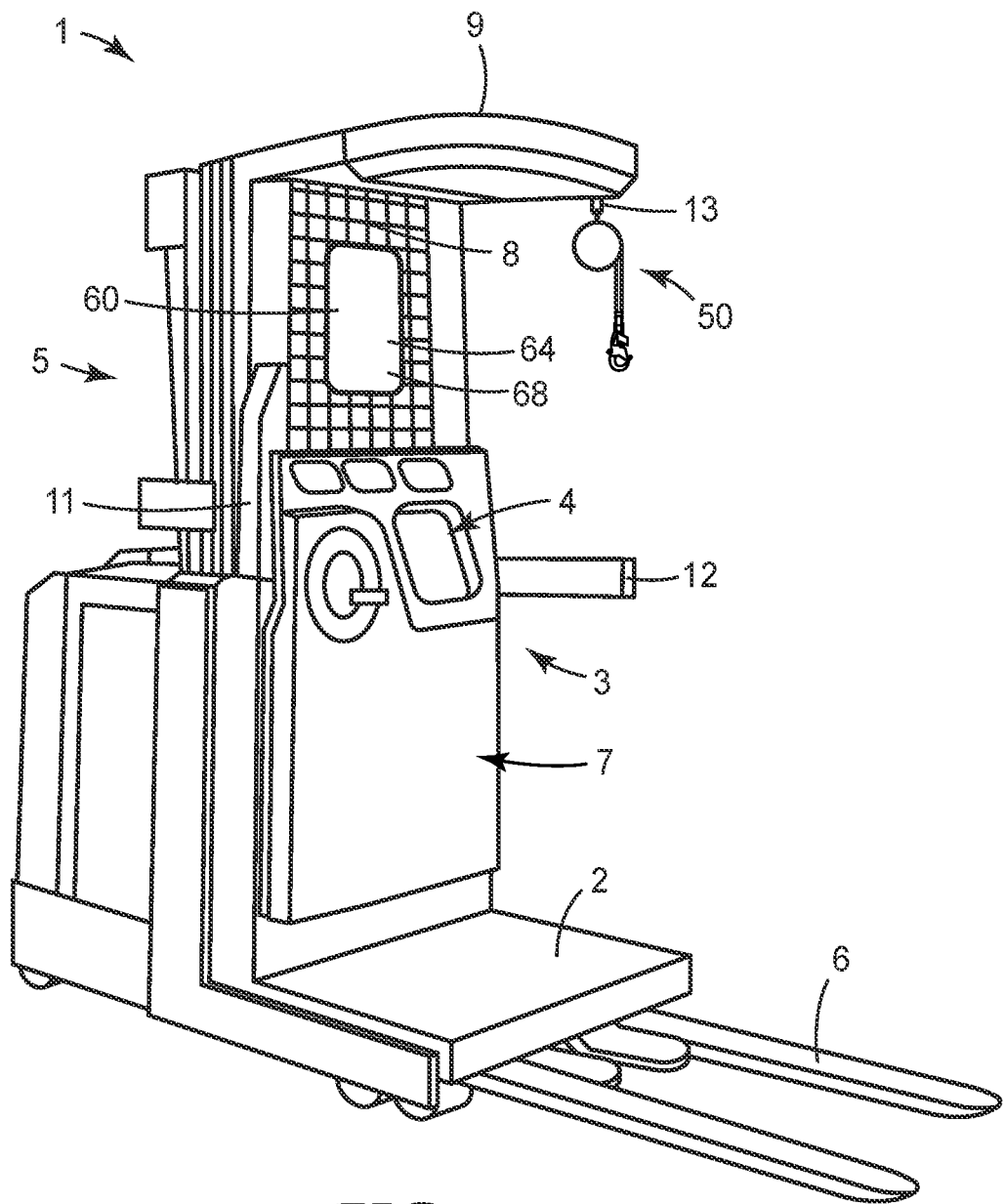
FIG. 1 is a side perspective view of an aerial lift, in exemplary, generic representation, the aerial lift being an order picker equipped with a monitored fall-protection system, also shown in exemplary generic representation.

Like reference numbers in the various figures indicate like elements. Some elements may be present in identical or equivalent multiples; in such cases only one or more representative elements may be designated by a reference number but it will be understood that such reference numbers apply to all such identical elements. Unless otherwise indicated, all figures and drawings in this document are not to scale and are chosen for the purpose of illustrating different embodiments of the invention. In particular the dimensions of the various components are depicted in illustrative terms only, and no relationship between the dimensions of the various components should be inferred from the drawings, unless so indicated. Although terms such as "first" and "second" may be used in this disclosure, it should be understood that those terms are used in their relative sense only unless otherwise noted. Furthermore, such terms do not invoke any temporal order unless specifically notes. Terms such as vertical, upward and downward, above and below, and so on, have their ordinary meaning with respect to the Earth's gravity. The horizontal direction likewise has its ordinary meaning as any direction perpendicular to the vertical direction.

As used herein as a modifier to a property or attribute, the term "generally", unless otherwise specifically defined, means that the property or attribute would be readily recognizable by a person of ordinary skill but without requiring a high degree of approximation (e.g., within +/−20% for quantifiable properties). The term "configured to" and like terms is at least as restrictive as the term "adapted to", and requires actual design intention to perform the specified function rather than mere physical capability of performing such a function. All references herein to numerical parameters (dimensions, ratios, and so on) are understood to be calculable (unless otherwise noted) by the use of average values derived from a number of measurements of the parameter.

DETAILED DESCRIPTION

Disclosed herein are monitored fall-protection systems. In some embodiments, such systems can be used with aerial lifts, as exemplified e.g. by so-called order pickers; an order picker 1 is shown in exemplary, generic representation in FIG. 1. Order pickers are material-handling vehicles that are widely used to pick items from vertical stacks, from shelves of various heights, and so on. As shown in exemplary embodiment in FIG. 1, an order picker is a motorized vehicle having a generally horizontal operator platform 2 that supports a human operator and that is elevatable to a considerable height as shown in exemplary embodiment in FIG. 2. The operator typically stands on operator platform 2, but in some embodiments platform 2 may be provided with a seat, stool or the like. In some embodiments, the order picker includes controls 4 that allow the operator to manually drive the order picker from place to place and/or to raise and lower the operator platform. In some embodiments, the horizontal movement (i.e., driving from place to place) of the order picker and/or the vertical elevation of the operator platform may be remotely controlled or autonomously controlled rather than being manually controlled by the operator.

Figure 2:
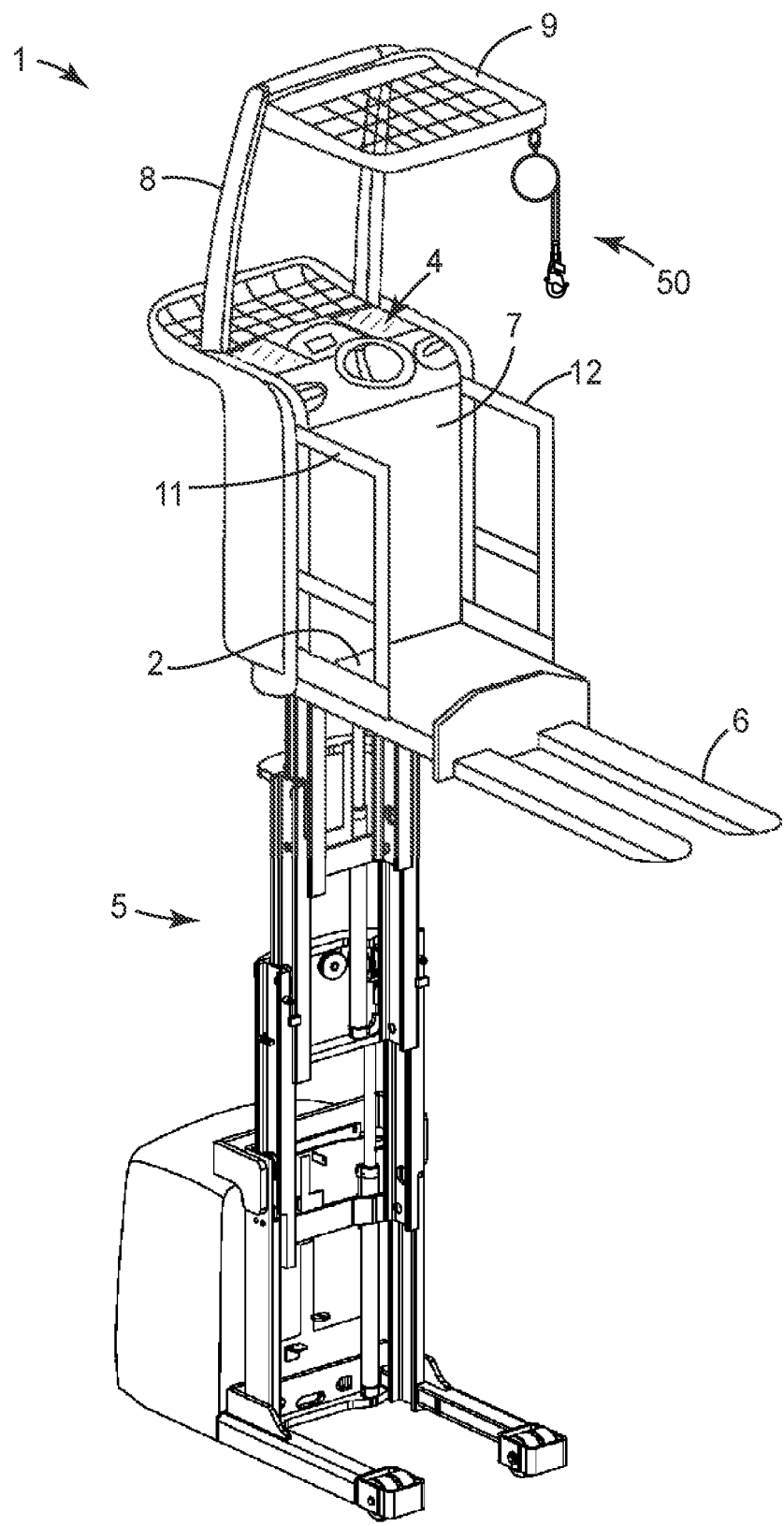
FIG. 2 is a side perspective view of another exemplary order picker, shown in a vertically elevated configuration.

As shown in exemplary embodiment in FIG. 2, an order picker will often comprise a telescoping mast assembly 5 comprising multiple telescoping sections (e.g. two, three or more) that allow platform 2 to be elevated to a considerable vertical height (e.g., 1, 2, 4, 6, 8 or 10 meters or more). (Some such order pickers may be referred to as "high reach" order pickers.) Order pickers allow an operator on platform 2 to be positioned so that the operator can manually grasp one or more items and remove them from an elevated location, e.g. from a shelf or stack. In many embodiments, an order picker will comprise a set of forks 6 that allow larger items (e.g. pallets) to be removed from an elevated location. An order picker thus comprises an operator-supporting platform 2 that is vertically movable between a first, "lowered" position in which the platform is proximate the ground or floor upon which the order picker resides (and in which condition the order picker may be horizontally moved, e.g. driven), and a second, "raised' position. The second, raised position may, at any given time, be any of a plurality of elevated-height positions, e.g. as chosen by the operator as needed to reach a particular item.

In many embodiments, an order picker will comprise a console 7, which may present the above-described controls 4. In many cases an order picker may comprise a generally vertical wall or panel 8 that rises above the controls and that supports a generally horizontal roof 9. The terms wall and roof are not meant to limit such entities to purely continuous (e.g. unbroken or uninterrupted) structures. Any such entity may, for example, take the form of e.g. one, two or more beams, columns, or the like, e.g. with at least some empty space therebetween.

Typically, console 7, panel 8, and roof 9 are in fixed relation to operator platform 2 so that these components move vertically in lockstep with platform 2. In many embodiments at least portions of panel 8 and/or roof 9 may be transparent to enhance the operator's visibility of the horizontal and vertical surroundings. For example, in many embodiments at least a portion of panel 8 may comprise a grid or mesh of widely-spaced wires, as shown in exemplary embodiment in FIG. 1.

In some embodiments, first and second (e.g., left and right, from the perspective of FIG. 1) rails or arms 11 and 12 may be connected to order picker 1 (e.g. to a portion of the mast assembly or the console) as shown in exemplary embodiment in FIG. 1. In some embodiments, one or both such rails may be e.g. pivotable about a connection to order picker 1 so that the rail can be raised into an "open" position that allows an operator to step onto platform 2 and can then be lowered into a "closed" position. In some embodiments, the rails may be independently operable so that one may be in an open position while the other is in a closed position (e.g. as in the exemplary embodiment of FIG. 1); in other embodiments the rails may operate in unison. In some embodiments, one or both rails may be manually openable and closable; in other embodiments, one or both rails may be configured to automatically open when platform 2 is in its lowered position and to automatically close as platform 2 leaves the lowered position. In some embodiments one or both rails may be configured to automatically move to the closed position when it is detected that an operator is standing on platform 2; in such cases the operator may e.g. enter a control input (e.g. press a button) to momentarily open at least one rail in order to exit the platform. In some such embodiments the order picker may comprise an interlock that only allows the rail(s) to be opened when the order picker is in its lowered configuration.

It will be appreciated that the above-described arrangements are exemplary and that many arrangements of rails, e.g. that can be moved between an open position and a closed position, are possible. For example, some such rails may pivotally move upward, rather than downward, into a closed position. Some such rails may move slidably rather than pivotally. In some embodiments, such a rail may be provided in association with e.g. one or more vertical members, columns or panels (e.g. as in the exemplary arrangement of FIG. 2). In some embodiments one or more vertical members may e.g. swing downward from the rail as the rail moves into a closed position; or, such a member may be in fixed relation to the rail. Any such arrangement may border, e.g. may at least partially enclose, the lateral (left and right, from an operator's perspective) sides of platform 2. In some embodiments any such arrangement of lateral rails (and additional members and so on, if present) may be fixed in place rather than movable. In some embodiments, an arm, rail, panel or the like may be provided at or near the "rear" of platform 2 (e.g. in a location opposite the console 7). However, in many embodiments this end of platform 2 may be left relatively open so that the operator can easily reach and grasp an item that is to be removed from an elevated location.

An aerial life, e.g. an order picker 1, may be equipped with a monitored fall-protection system as disclosed herein. As shown in exemplary embodiment in various Figures, such a fall-protection system may include a harness 40 configured to be worn by a human operator of the aerial lift and a fall-protection apparatus 50 comprising a lifeline 52 equipped with a connector 30 configured to be connected to the harness. (Other components may be present as well, as will be well understood by artisans in the field.) Any such connector may be referred to herein by the generic terminology "hook"; however, it will be understood that such connectors are often referred to as carabiners, with there not necessarily being a firm dividing line between the two. A hook or carabiner (illustrated in further detail in exemplary embodiment in FIG. 3) will comprise a hook body 31 and a movable gate 32. In at least some embodiments, any such connector will be compliant with ANSI standard Z359.12-2009. In some embodiments a connector may be a double-action connector (i.e. with a gate that requires at least two consecutive, different actions to open). One category of double-action connectors are so-called twist-lock hooks and carabiners of the general type exemplified by the product available from 3M Fall Protection under the trade designation KJ5108 HOOK CONNECTOR and various connectors available from 3M Fall Protection under the trade designation SAFLOK. In such connectors, a locking mechanism of the gate of the connector must be twisted (e.g. at least a quarter turn, around an rotation axis aligned with the long axis of the gate) in order to unlock the gate so that it can then be opened. In various embodiments, such a locking mechanism may be e.g. a collar fitted on a portion of the gate; or, the entirety of the gate may be twistable. Some such double-action connectors (e.g. products available from 3M Fall Protection under the product numbers 2000300 and 2000301) are actually triple-action connectors in which the gate must be moved slightly along its long axis before it can be rotated to allow the gate to be opened. Another category of double-action connectors are so-called snap hooks (or locking snap hooks) in which a locking mechanism must be moved (e.g. pressed inward or squeezed) before the gate of the hook can be opened. Such connectors include those available from 3M Fall Protection under the products numbers 2007153 and 9510057. All such items will be considered to be connectors as defined herein, and may be referred to generically as "hooks".

Figure 4:
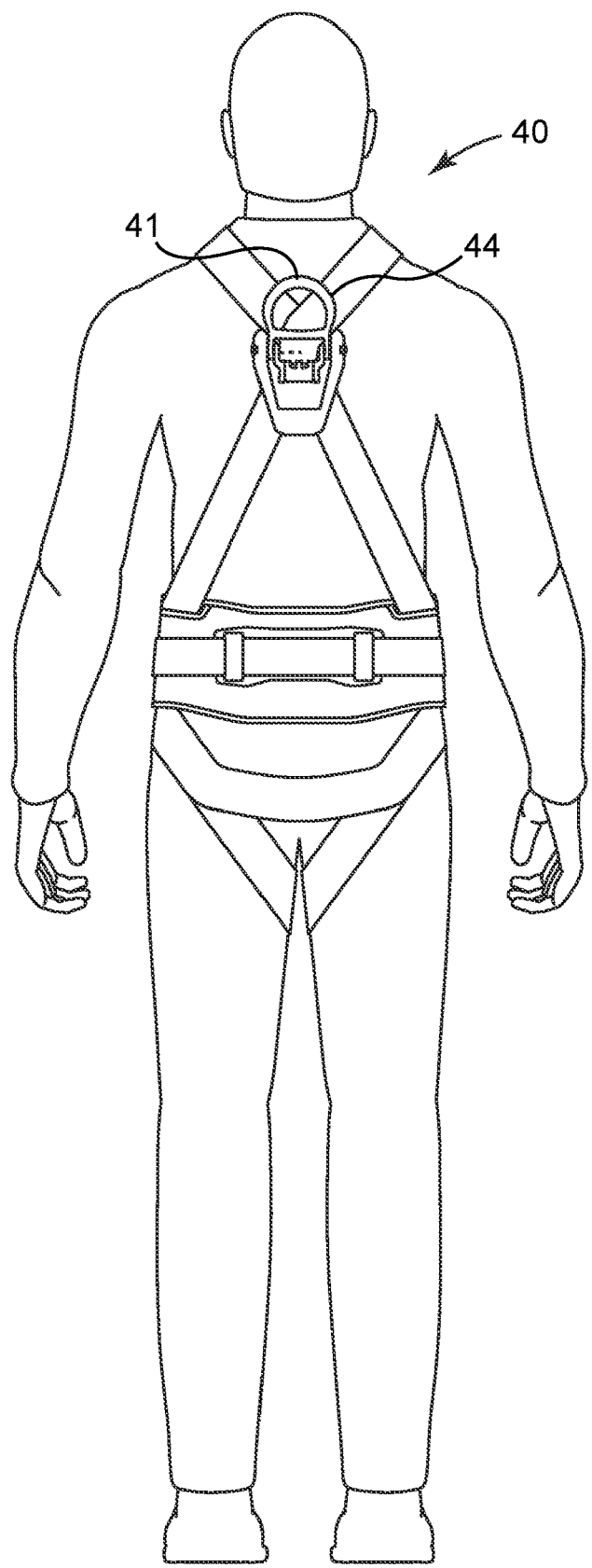
FIG. 4 is a rear view of a fall-protection harness suitable for use in a fall-protection system of an aerial lift.

In many embodiments such a connector may be configured to be connected to a harness 40 by being attached to a D-ring that is non-removably mounted on the harness. In particular embodiments the connector may be attached to a dorsal D-ring 41 of the general type illustrated in FIG. 4.

Figure 3:
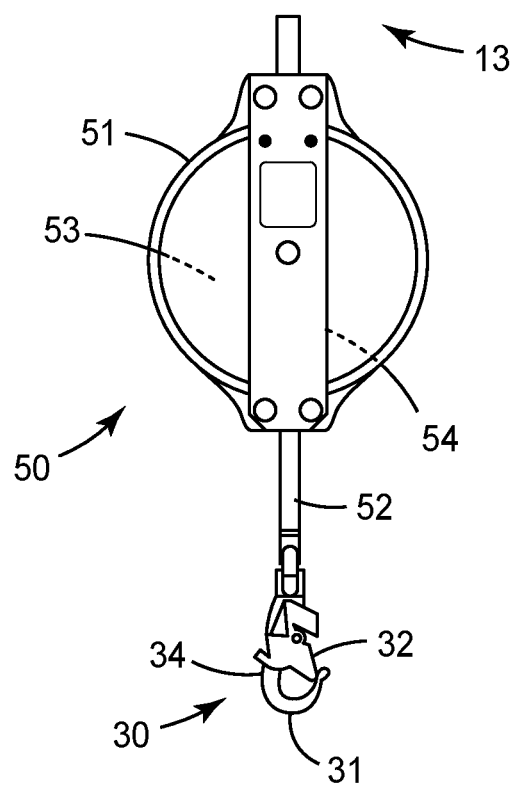
FIG. 3 is a front view of an exemplary fall-protection apparatus suitable for use in a fall-protection system of an aerial lift.

In many embodiments fall-protection apparatus 50 may be a so-called self-retracting lifeline ("SRL") as shown in exemplary embodiment in FIGS. 1-3. Ordinary artisans will understand that a self-retracting lifeline comprises a load-bearing line ("lifeline") 52 that can be unwound from a housing 51 which may be secured to an anchorage 13 (e.g. located on a "roof" 9 of an aerial lift). A distal end of lifeline 52 is connectable, e.g. by way of a connector (e.g. a double-action hook) 30, to harness 40.

Housing 51 comprises a reel (drum) 53 (indicated generically in FIG. 3) to which a proximal end of lifeline 52 is attached. Lifeline 52 can be unwound from reel 53 and thus extended from housing 51 to follow a user as the user moves about, with reel 53 being biased so that the reel retracts lifeline 52 back into housing 51 and rewinds it onto reel 53 as the user moves toward housing 51. Such an SRL (e.g. housing 51 and reel 53 thereof) includes a brake (e.g. comprising centrifugally-activated pawls that act in cooperation with a friction pad or the like) that is triggered in the event of a user fall (e.g. upon rapid unwinding of lifeline 52) to safely bring the user to a halt. Fall-protection apparatus such as self-retracting lifelines and components and functioning thereof are described in various aspects in U.S. Pat. Nos. 7,843,349, 8,256,574, 8,430,206, 8,430,207, and 9,488,235. In some embodiments a self-retracting lifeline will meet the requirements of ANSI Z359.14-2012.

Any such fall-protection apparatus may be configured to allow an operator of an aerial lift (e.g. an order picker) to perform actions as needed while the platform of the aerial lift is in an elevated condition. For example, the operator will be able to operate the aerial lift controls, to reach for and retrieve an item on an elevated shelf proximate the platform of the lift, and so on. A fall-protection apparatus that is a self-retracting lifeline can further provide that the operator can move about (e.g. can momentarily step off the platform of the aerial lift) for short distances as needed, e.g. when the aerial lift is in the "lowered" position.

A fall-protection system as disclosed herein comprises a monitoring system configured to provide a notification of a condition of a connector (or connectors) of the fall-protection system. In many embodiments this notification may be primarily intended for an operator of the aerial lift with which the fall-protection system is used. However, in some embodiments the notification may (for example, if broadcast in the form of a visible signal such as a flashing light, or an audible signal such as a beeping tone) be evident to other nearby persons in addition to the operator. The fall-protection system comprises at least one base unit and at least one sensor module, the sensor module being configured to sense a condition of a connector and to communicate a signal indicative of the condition of the connector to the base unit. Such a sensor module may thus comprise at least one sensor (discussed in further detail later herein) to sense the condition of the connector and a communication module that transmits this information (whether wirelessly, or by a wire or fiber optic cable) to the base unit. The base unit comprises a receiving module that can receive information from one or more sensor modules, and a notification module to emit or otherwise broadcast a notification at least to the operator of the aerial lift based on the information received from the sensor module.

In some embodiments the base unit may receive raw (or partially processed) data from the sensor module and may perform any or all actual processing that is needed to ascertain the condition of the connector in order to issue a notification indicative of this condition. In other embodiments, the raw data may be at least partially processed by a processor that is resident within the sensor module itself. In at least some such cases, the base unit need only receive a signal from the processor that is indicative of the condition of the connector and use this signal to cause the notification module to issue the proper notification.

The signals transmitted from the sensor module(s) to the base unit, and the resulting notifications issued by the base unit, can aid an operator of an aerial unit in appreciating the condition of the connector. For example, a notification may remind an operator that the connector appears to have not yet been attached to the operator's harness. In various embodiments, such notifications may be presented in any suitable way, e.g. in a manner that cautions the operator against elevating the aerial lift if the connector has not yet been attached to the harness. In addition to (or in place of) the already-mentioned visible or audible signals, other possible notifications include e.g. mechanical or tactile notifications. For example, an elevation-control handle, steering wheel, or the like, of the aerial lift could be equipped with a device that vibrates or otherwise provides a recognizable tactile signal.

A base unit may thus be configured to emit (e.g. to broadcast, e.g. in the form of a visible signal and/or an audible signal) a first notification if a first signal is received from the sensor module indicative of a first condition of the connector, and/or to emit a second notification if a second signal is received from the sensor module indicative of a second condition of the connector. In this context, the terms first and second do not indicate a difference in temporal order but rather denote that the second signal is different from the first signal, the first condition of the connector is different from the second condition of the connector, and so on.

For example, a first signal transmitted from the sensor module to the base unit may indicate that a connector is in a first condition ("Ready") in which it appears to be connected to harness 40, e.g. attached to a D-ring 41 of the harness. A second signal may indicate that the connector is in a second condition ("Not ready") in which it appears that the connector may not be connected to harness 40. A first notification may thus be e.g. a "Ready" notification and a second notification may be e.g. a "Not ready" notification. In this context, a notification of "Not ready" means that the platform may not be ready to be elevated because the fall-protection system may not be in a fall-protective condition (i.e. the connector may not be attached to the harness) and serves to remind the operator to attach the connector to the harness before elevating the platform. Equivalent second notifications could be worded e.g. "Not tied off", "Are you hooked up?", or like expressions. A first notification of "Ready" (and like terminology, e.g. "Tied off") indicates that the fall-protection apparatus appears to be in proper fall-protective condition for elevation of the aerial lift. (However, this does not relieve the operator of any duty to perform further inspections or procedures as needed to ensure the status of the fall-protection system, as discussed later herein.) In some embodiments a first notification might be e.g. illuminated green, and a second notification might be illuminated red (irrespective of whether or not either notification includes text), with the meanings of such notifications having been made clear to the operator e.g. when the operator is trained in use of the fall-protection system.

In some embodiments, the only notification that is actively emitted by the base unit may be a second, "Not ready" notification. For example, in some embodiments the base unit, upon receiving a second signal from the sensor module as described above, may emit a second notification in the form of a visible signal and/or an audible signal. Upon the base unit receiving a first signal from the sensor module as described above, this second notification may cease without being actively replaced by a first notification. (In other words, a formerly-illuminated "Not ready" light may be deluminated without any other light then being illuminated.) In embodiments of this type, the absence of a "Not ready" notification will be considered to be a passive notification that is equivalent to an active "Ready" notification, and vice versa. In other words, notifications as defined and described herein encompass both active notifications (e.g. an illuminated light or an audible sound) and passive notifications in the form of an absence of an active notification. It will be appreciated that there are many such possible notifications and phrasings thereof, with the above only being exemplary possibilities.

In some embodiments, a sensor module 34 of a fall-protection monitoring system may be installed at a connector (e.g. a double-action hook) 30. Such terminology encompasses arrangements (illustrated generally in FIG. 3) in which the sensor module is located on the connector or is located proximate the connector (e.g. mounted on lifeline 52 or on a protective shroud located thereon) as long as the sensor module is close enough to the connector to allow the condition of the connector to be successfully monitored, e.g. to evaluate whether the connector appears to have been attached to a D-ring. In some embodiments, a sensor module 34 may be installed within a housing (e.g. a molded plastic housing) that is fitted over at least a portion of connector 30.

In some embodiments, a sensor module 44 of a fall-protection monitoring system may be installed on a harness 40 to which connector 30 is to be attached. For example, a sensor module may be installed at a D-ring (e.g. a dorsal D-ring 41) that is non-removably attached to harness 40. Such terminology encompasses arrangements (illustrated generally in FIG. 4) in which the sensor module is located on the D-ring or is located proximate the D-ring (e.g. on a strap or a dorsal plate of harness 40) as long as the sensor module is close enough to the D-ring to allow the sensor of the sensor module to evaluate whether a connector appears to have been attached to the D-ring.

The arrangements disclosed herein thus encompass, for example, configurations in which a connector is monitored for an indication as to whether the connector appears to have been attached to a D-ring, as well as arrangements in which a D-ring is monitored for an indication as to whether a connector appears to have been attached to the D-ring. Other arrangements are also possible as discussed later herein.

A base unit of the monitoring system, that receives signals indicative of the condition of the connector, can be positioned in any suitable location. In some embodiments, a base unit may be installed at the connector of a lifeline (e.g. the base unit may be co-located with a sensor module that is on or proximate a hook). In some embodiments, a base unit may be installed on the harness. For example, a base unit may be installed at a harness D-ring. In such embodiments, the base unit may be co-located with a sensor module that is installed at the D-ring and may receive signals therefrom; or, the base unit may be installed on the harness but may receive signals from a sensor module that is installed at the connector rather than at the D-ring.

In some embodiments, a base unit may be installed at, on, or within a housing of a self-retracting lifeline. In various embodiments a base unit may be installed e.g. at a connector; on a harness; or on a housing of an SRL. In various embodiments a base unit may be installed on, e.g. at any point along, a lifeline of an SRL (or of a lanyard as described later herein). In some embodiments a base unit may be installed on any component associated with a lifeline. For example, a base unit might be mounted on a protective shroud of the general type described in U.S. Provisional Patent Application No. 62/480,807 and in PCT International Patent Application Publication No. WO 2018/185614, both of which are incorporated by reference herein in their entirety. Or, a base unit might be mounted on, or otherwise associated with, an energy absorber of a lifeline of an SRL or lanyard.

In many convenient embodiments, a base unit may be installed on an aerial lift. For example, a base unit 60 may be installed on an order picker in a location that ensures that a visible notification emitted by the base unit is readily visible to the operator of the order picker. For instance, in some embodiments a base unit 60 may be mounted on a vertical panel 8 of an order picker (e.g. at or near eye level of an operator standing on platform 2) as shown in exemplary embodiment in FIG. 1. It is noted that FIG. 2 does not include a depiction of a base unit and that the exemplary order picker of FIG. 2 does not include a vertical panel of the same exact type depicted in the order picker of FIG. 1; FIG. 2 is included to generally illustrate how an order picker can be transformed into an elevated configuration. However, ordinary artisans will appreciate that it would be straightforward to install a base unit in a visible location of the order picker of FIG. 2, e.g. positioned on a spar that extends from one of the vertical columns that support the roof of the order picker (and that, in this design, collectively constitute a vertical "panel" of the order picker). Other mounting locations are also possible, e.g. on a console 7 of an order picker.

In some such embodiments, a notification unit can be provided that is separate from the base unit and is located e.g. on a vertical wall of the aerial lift (or in some other easily visible location) and that can be instructed by the base unit to broadcast a visible and/or and audible notification. That is, in some embodiments a notification unit may be separated from the base unit and may be solely for the purpose of broadcasting a notification rather than comprising any other functionality. For example, in some embodiments a base unit may be positioned on a roof 9 of an order picker (e.g. mounted to the underside of the roof) where it is not in the user's way, and may operate a notification unit that is positioned on console 7 or front panel 8 of the order picker. Any such notification unit can be configured (e.g. shaped and positioned) to ensure that it easily visible but does not interfere with the vision of the operator of the order picker. Any such notification unit (comprising e.g. a string of LED lights) may be directly wired to the base unit, or the base unit may wirelessly operate the notification unit. It is not strictly necessary that an audible signal be broadcast from the same location as a visible signal; so, if desired, the monitoring system may comprise two physically separate notification systems, e.g. one audible and one visible.

In some embodiments, a fall-protection system can optionally include a docking station to which connector 30 can be docked (i.e., secured) when not in use. In some embodiments a docking station can be a separate entity from base unit 60. In other embodiments a docking station can be integrated with base unit 60, as for docking station 68 generally indicated in FIG. 1. In some embodiments a docking station may be a purely mechanical apparatus that does not participate, either actively or passively, in the fall-protection monitoring system. In other embodiments a docking station may be configured (e.g. equipped with a sensor module 64) to participate in the fall-protection monitoring system. That is, the presence of a docking station (whether integrated with base unit 60, or provided as a separate item at a separate location on the aerial lift) to which a connector 30 is to be docked, offers another way in which the condition of the connector may be monitored. For example, a connector 30 and a docking station 68 may be arranged (e.g. with a sensor module 64 installed at the connector) so that the connector-mounted sensor module can ascertain that the connector appears to be docked on (secured to) docking station 68. Alternatively, the docking station may comprise a suitably-configured sensor module 64 (illustrated generally in FIG. 1) that can ascertain whether connector 30 appears to be docked on the docking station. Any such sensor module may transmit signals to the base unit that allow the base unit to provide notifications indicating that the connector appears to be in a docked state or an undocked state. In some embodiments such notifications may be available in addition to, and/or independently of, other notifications that might be provided (e.g. a notification that the connector appears to be attached to a D-ring).

Still other arrangements are possible. For example, in embodiments in which the fall-protection apparatus is a self-retracting lifeline (SRL) 50, the SRL may comprise a sensor module 54 (illustrated generally in FIG. 3) that is configured to monitor the position of connector 30 relative to the housing 51 of the SRL. Such a sensor module might comprise e.g. a sensor configured to ascertain whether connector 30 is in close proximity thereto (such a sensor might be e.g. an inductive sensor of the general type described later herein). Or, such a sensor module might comprise a sensor that is configured to determine the distance to which lifeline 52 has been paid out from housing 51 (such a sensor might be, for example, a rotary encoder that tracks the rotation of reel 53 to which the proximal end of lifeline 52 is attached). Such a sensor module may thus be configured to provide an indication of, for example, whether connector 30 is snugged up tight against the SRL housing or is proximate (meaning within 0.2 meters of) the housing; or, whether connector 30 has been paid out a considerable distance (e.g. more than 0.2 meter) from the housing. Such information can be used, if desired, as an indication of the condition of the connector. For example, if the connector is reported to be snugged tight against the SRL housing or proximate the SRL housing, this may be inferred to be an indication that the connector is not attached to a harness of an operator. The specific distances corresponding to various conditions may be established in view of the particular SRL used, how high above the operator platform of the aerial lift the SRL is located, and so on.

The discussions above make it clear that a sensor module may be installed e.g. at a connector itself, at a harness D-ring to which the connector is to be attached, or at a docking station (if present) to which the connector can be docked when not in use. Or, a sensor module may be installed at an SRL housing from which a lifeline bearing the connector can be extended. Any such arrangement, and in any desired combination of such arrangements, is encompassed within the disclosures herein. While some Figures herein illustrate multiple sensor modules (e.g. FIG. 3 depicts a hook-resident sensor module 34 and an SRL-resident sensor module 54) it will be understood that these Figures are illustrative and that multiple sensor modules may not necessarily be present.

The term sensor module is used in general to describe a device that comprises at least one sensor that performs any actual sensing required, a processor that includes a communication module to send the information gathered by the sensor to a base unit, and all necessary hardware, software, power sources (e.g. a battery) and so on, to operate the sensor(s), the communication module, and so on. The sensor module may e.g. be partially or wholly encompassed within a housing, e.g. a molded plastic housing, which housing may be e.g. attached to or otherwise disposed on a connector or a D-ring. In some embodiments the sensor module may be attached e.g. to a lifeline or a shroud thereon, or to a component (e.g. a strap or a dorsal plate) of a harness, as long as the sensor of the sensor module is positioned in a location that allows it to perform its desired function.

In some embodiments, a sensor of a sensor module may be configured to detect metal. This may be useful since many connectors (e.g. hooks/carabiners) and D-rings are made of metal such as steel or the like. Thus, a sensor located at a D-ring or docking station may be able to detect the presence of a metal connector; conversely, a sensor located at a connector may be able to detect the presence of a metal D-ring, and so on. In particular embodiments, any such sensor may be configured to particularly detect a metal item or a portion thereof that is positioned within, or close to, an opening defined by the entity at which the sensor is installed. For example, a connector (e.g. a hook) may be equipped with a sensor module whose sensor or sensors are configured to detect a portion of a metal item (e.g. a D-ring) that is within, or close to, the opening defined by the hook. Any such sensor, if installed on or near an entity that is itself made of metal, may be configured to compensate for such metal (i.e., the sensor may be configured to detect the presence of an additional metal item, above and beyond the metal that is already there).

In some embodiments such a sensor may rely on magnetic sensing. In some embodiments such a sensor may rely on inductive sensing. In some embodiments of this type, such a sensor may take into account eddy current phenomena e.g. generated when a metal item is brought into an inductive field. Inductive sensing in general, and leveraging of eddy current phenomena in particular, are discussed in detail in U.S. Provisional Patent Application No. 62/628,720, and in PCT application No. US2019/016768, both of which are incorporated by reference in their entirety herein. It will be appreciated that many of the principles, arrangements and methods disclosed in these documents may be useful for purposes of the present application. In some particular embodiments involving inductive sensing, any such inductive sensor will not include a coil disposed around an elongate component of a connector (e.g. a body, loop portion, or gate of a hook or carabiner). Various sensors that do not include such a coil are described e.g. in the above-cited '720 and '768 applications.

Although discussions above have primarily concerned sensing of metal items, e.g. by inductive sensing, it will be appreciated that any sensor, relying on any sensing mechanism, may be used e.g. to sense whether an item is present in an opening defined by the hook. In various embodiments, such a sensor may be any kind of electromechanical sensor, e.g. a load cell that can detect whether the hook has been placed under load. In some embodiments, such a sensor may be an RFID reader that is configured to detect an RFID tag that is present on or in the item (e.g. a D-ring, a docking station, etc.) that the hook is to be connected to.

In some embodiments, some other sensor, operating by any sensing mechanism and provided in any particular location and/or applied to any particular step or operation in the use of connector 30 or of the fall-protection system in general, may be used. Such a sensor may operate by some other mechanism than detecting whether an item is present in the opening defined by the hook. While in some embodiments such a sensor may be used in place of the above arrangements, in many advantageous embodiments such a sensor may be used in combination with the above-described arrangements. For example, in some embodiments a hook may be provided with a gate sensor that can monitor the status of a gate of the connector. Such a sensor may be used e.g. in combination with any of the other sensors described herein. For example, in some embodiments one or more first sensors may be used that are inductive sensors configured to determine whether a metal item (e.g. a metal D-ring) is present in the opening of the connector; and one or more second, gate sensors may be used to monitor the status of a gate of the connector.

Any such indication provided by a gate sensor will fall under the general category of reporting whether the gate is "secured" or "unsecured". It is not necessary that, for example, a gate of a hook must actually be in an open position to be reported as "unsecured". Rather, the gate may merely be e.g. unlocked. For example, a connector may be a double-action connector of the general type noted earlier, for example a "twist-lock" hook in which a locking mechanism of the gate of the hook must be rotated slightly in order to unlock the gate so that it can then be opened. A gate sensor may be configured to monitor that the gate is unsecured if it is detected that the locking mechanism has been rotated to the unlocked position, even if the gate has not actually been opened.

In some embodiments a second sensor or sensors such as e.g. a gate sensor, may operate by a different mechanism than the first sensor or sensors. For example, in some embodiments, a gate sensor may be a so-called Hall-effect sensor. In some embodiments such a sensor may be configured to detect the presence or absence (within a predetermined distance) of a magnetic beacon that is purposefully installed in the gate. For example, such a magnetic beacon (e.g. a piece of any suitably magnetic material) may be e.g. installed into a cavity provided in a twistable portion (e.g. a locking mechanism) of the gate. The gate sensor may detect the magnetic beacon, and report its presence, when the beacon is in close proximity (e.g. when the gate is secured). The sensor may then report the absence of the magnetic beacon when the twistable portion of the gate has been twisted to unlock the gate (thus moving the beacon away from the sensor). In some embodiments any such gate sensor may alternatively be configured (e.g. the sensor and magnetic beacon may be positioned) to detect the beacon when the gate is not secured, and to detect the absence of the beacon when the gate is secured.

As noted earlier, in many embodiments the output of a monitoring system as disclosed herein will be a notification of a Ready or Not ready condition (of any suitable phrasing), based on a signal received from at least one sensor or sensors. In some embodiments in which first and second sensors are used, a signal from the first sensor alone, or a signal from the second sensor alone, may not be sufficient to allow a notification of a Ready condition. That is, in some embodiments an appropriate signal much be received from both the first sensor(s) and from the second sensor(s). Thus, for example, a monitoring system for a double-action hook may be configured so that a signal must be received from a first sensor indicating that a metal item (e.g. a metal D-ring) is or has been detected in the opening of the hook; and, a signal must be received from a second sensor indicating that the gate of the hook is secure, in order for a Ready notification to be signaled.

A first, inductive sensor or sensors may not necessarily need to continuously detect the presence of a metal item in the opening of the connector. That is, in some cases a metal item (e.g. a D-ring) may shift position relative to the hook e.g. as the wearer moves around, bends over, stands up, and so on. Thus in some embodiments, the sensor module may be configured so that if a metal item is detected at least once (or any suitable number of times) e.g. during a selected time period, this will be sufficient to allow a conclusion that the item is present, even if the item is not detected subsequently. In particular embodiments, such an arrangement can be used in combination with a gate sensor. For example, as long as the gate sensor has not detected that the gate has been opened (or, in general, has become unsecured), the sensor module may continue to signal that the connector is in a "Ready" condition, even if the first item is not currently being detected by the first, inductive sensor.

In some embodiments at least one first sensor (e.g. relying on magnetic induction to detect whether a metal item such as a D-ring is present within the opening of the connector) and a second sensor (e.g. a Hall-effect sensor that detects whether the gate of the connector is secured) may be co-mounted on a common printed circuit board or flex circuit, e.g. along with a processor and any ancillary components as needed to operate the sensor module. In some embodiments the processor may process the data received from both the first sensor(s) and the second sensor(s), in combination, to reach an indication of the connector status (e.g. Ready or Not Ready) and may then wirelessly forward a signal bearing the indication (e.g. via a Bluetooth communication module) to the base unit.

In embodiments in which a docking station is used, the docking station may comprise a sensor (which may be an inductive sensor, but could comprise something as simple as a mechanical gate or turnstile) that records whether or not the connector appears to be docked in position in the docking station. Thus in summary, any suitable sensor, operating by any sensing mechanism, for example one or more mechanical gates or switches whose physical position may be monitored, one or more members or platens that are sensitive to pressure or force, a combination of an RFID reader (or, more generally, a Near-Field Communication reader) and one or more appropriately positioned RFID or NFC tags, and so on, may be used, e.g. in addition to, or instead of, the above-described sensors.

In some embodiments, a sensor module as disclosed herein may comprise a sensor that is an image-acquisition device, e.g. a camera, that is positioned and configured to evaluate whether a connector appears to be, for example, hanging from an SRL housing, parked in a docking station, attached to a harness D-ring, and so on. In such embodiments, the sensor module (or the base unit) may comprise any suitable software (e.g. image-recognition and processing software) as needed to achieve such capability. In some embodiments such a camera or cameras may be the only type of sensor present; or, the camera or cameras may work in conjunction with any of the previously-described sensors.

The systems, methods and apparatus disclosed herein may be used with any type of connector used in a fall-protection apparatus or system, for example, hooks, carabiners and D-rings (noting again that there may not always be a clear distinction between connectors that are referred to as hooks and those that are referred to as carabiners).

In some embodiments, such connectors include connectors that are specially configured to be used in pairs (e.g. one on a lifeline and one on a harness; or, on ends of first and second straps, lines or the like) and that are specifically configured to be mateable or otherwise engageable with each other but not to be mateable to other types of connectors. In some embodiments such connectors include modular connectors of the general type described in the 3M DBI-Sala Fall Protection Full-Line Catalog 2017 as being supplied as components of Modular Lanyards such as e.g. the EZ-STOP MODULAR LANYARD.

Such connectors may, for example, comprise a design in which a female connector comprises a generally T-shaped slot configured to accept a generally T-shaped bar of the other, male connector. In many embodiments, such connectors may be lockable when engaged so that they cannot be disengaged from each other without a prior, purposeful manipulation that places them into an unlocked condition in which they can be disengaged from each other.

In some embodiments, such connectors include so-called quick connectors of the general type supplied as a component of e.g. the 3M DBI-SALA NANO-LOK Self-Retracting Lifeline, quick-connect buckles of the general type supplied as a component of e.g. the 3M DBI-SALA EXOFIT STRATA Harness, and the like. However, in many convenient embodiments a connector of a lifeline (e.g. the connector bearing the sensor module) may be a hook, and the entity to which it is to be connected is a D-ring of a harness.

As noted above, in some embodiments, a housing of a self-retracting lifeline can comprise one or more sensors (e.g. rotary encoders) to track the extent to which the lifeline has been paid out of the housing. It will be appreciated that in some embodiments such capability can allow the providing of information regarding a possible fall event. That is, detection of any signature such as rapid payout of the lifeline, acceleration of the lifeline payout, detection of a sudden arrest of lifeline payout, and so on, may provide an indication that a fall event may have occurred. Thus in some embodiments, the arrangements as disclosed herein may comprise an additional functionality of being able to report a possible fall event. Sensors, systems, and various arrangements thereof that may be suitable for, e.g., detecting and/or logging possible fall events are discussed in various aspects, e.g., in U.S. Pat. Nos. 10,496,045 and 9,998,804; and, in U.S. Provisional Patent Application No. 62/543,564 and PCT International Publication No. WO 2019/030708, all of which are incorporated by reference herein in their entirety.

The above discussions have made it clear that a fall-protection monitoring system as disclosed herein may use a variety of signals and a variety of resulting notifications, and may be used in multiple different ways. Some arrangements (e.g. in which a D-ring of a harness is equipped with a sensor configured to detect a connector) may provide a "direct" indication that a connector appears to be attached to the D-ring and thus may provide a direct indication that the harness of an operator of an aerial lift appears to be connected to the lifeline of the fall-protection apparatus. Other arrangements may provide a direct indication of some other status of the connector (e.g. a docking station that is equipped with a sensor may be able to provide a direct indication that the connector appears to be docked) and thus may provide an "indirect" indication that the connector is not connected to the operator's harness. It will thus be appreciated that the arrangements and methods disclosed herein may be used in a variety of ways and implementations.

In some implementations such arrangements may not necessarily provide a direct indication of connector-harness attachment. For example, in some embodiments a fall-protection system as disclosed herein may be configured to provide a direct indication (e.g. a "Docked" light that illuminates when the connector is docked) that the connector appears to be docked. Such a notification (which may deluminate or be replaced by an "Undocked" notification when the connector is removed from the dock) may serve e.g. as a reminder to the operator that the connector has not yet been undocked; the operator may then be tasked with attaching the connector to the harness and verifying that the connector-harness attachment is properly completed.

In some embodiments, such arrangements may provide an indication (whether direct or indirect, and whether imparted by an active notification or a passive notification as discussed earlier herein) of whether the connector appears to be attached to the harness. However, even in arrangements that may provide a direct notification (e.g. in which a connector is equipped with a sensor that provides an indication that the connector appears to be attached to a D-ring of a harness), it will be understood that an operator will regard a resulting notification as being an indication. It is emphasized that the operator is tasked with carrying out any appropriate steps (e.g. as required by applicable laws, rules, codes, standards, and/or instructions) to verify that the connector is securely attached to the D-ring.

In any event, under no circumstances will the presence of any arrangement as disclosed herein relieve an operator of an aerial lift of the duty to follow all appropriate laws; rules; codes; standards as promulgated by applicable bodies (e.g. ANSI); instructions as provided by the manufacturer of the aerial lift; instructions as provided by the manufacturer of the fall-protection system; instructions as provided by the entity in charge of a facility in which the aerial lift is used, and so on.

In some embodiments a sensor module may be powered by an internal source, e.g. a battery. If the sensor module is located e.g. within a housing provided on a connector, then (depending on the size of the housing and the connector) the space available for a battery may be limited. In some such cases, the battery may need to take the form of one or more "coin" or "button" batteries rather than a conventional 12 Volt battery, in order to fit within the space available. In such embodiments, it can be advantageous to configure first and second sensors of the sensor module in a way that will maximize battery life without compromising the performance of the sensor module.

For example, in embodiments in which a first sensor is a magnetic induction sensor that detects whether a metal item such as a D-ring is present within the opening of the hook, and in which a second sensor is a gate sensor that is Hall-effect sensor that detects whether the gate of the connector is secured, the first, inductive sensor may exhibit a power consumption (when active) that is greater than the power consumption of the second, Hall-effect sensor, by a factor of ten, one hundred, or even one thousand. (Since many such sensors may be e.g. pulsed, any such power consumption may be averaged over a suitable period, e.g. a few seconds.)

Accordingly, in some embodiments the processor that operates the sensors may be configured so that the first sensor is not activated until the second (gate) sensor has detected a change in status of the gate, e.g. has detected that the gate has become unsecured. The first sensor may then be activated e.g. for a selected period of time as long as the gate remains in a particular condition (e.g. unsecured), and optionally for an additional selected period of time after the gate has returned to another condition (e.g. has become secured). After this, the first sensor can be returned to an inactive state in which it consumes little or no power. In some embodiments, the sensor module may be configured to inactivate the first, inductive sensor after the first sensor has detected a metal item, rather than remaining active for the duration of the selected time period, in order to further conserve power.

When a change in status of the gate is again detected, the first sensor may again be activated. Otherwise, the first sensor may remain in the inactive, low-power-consumption state indefinitely. It will be appreciated that according to the disclosures herein, not only can first and second sensors be used in combination to evaluate the status of a connector (e.g. a Ready state may not be indicated unless the second sensor indicates that the gate is secured, and the first sensor indicates that a metal item, e.g. a D-ring, has been detected within the connector opening), the sensors may be collectively configured for efficient power management. That is, a more energy-consumptive sensor need only be triggered to become active upon a suitable signal being received from a more energy-efficient sensor. Thus for example, a second, gate sensor may be constantly operated (e.g. interrogating the gate via the Hall effect, up to several times a second) with little power consumption, while a first, highly energy-consumptive inductive sensor may remain inactive until triggered by the processor to become active, in response to a change in gate status indicated by the second, gate sensor.

To further conserve power, in some embodiments the processor and/or the entire sensor module may be configured to enter a partially powered-down "sleep" mode in some circumstances. For example, such a sleep mode may be triggered in the event that, after a secured signal was received from the gate sensor, no further signal (e.g. indicating that the gate has now become unsecured) was received for a particular period of time. In some embodiments, when the sensor module is in such a "sleep" mode, the communication module, comprising e.g. a Bluetooth transmitter and/or receiver, may be turned off, until the processor is triggered to awaken from the sleep mode by an interrupt signal received from the second, gate sensor. The processor may then become fully active (e.g. it may establish Bluetooth communication with the base unit, and so on). Of course, in such embodiments the second, gate sensor may be hardwired to the processor to remain in constant communication with the processor, regardless of whether wireless communication is active.

In some embodiments, the arrangements disclosed above may be enhanced by configuring the fall-protection system and/or the aerial lift to determine whether or not an operator is actually present. For example, an order picker may be equipped with e.g. a proximity sensor (operating by any suitable mechanism) that determines whether an operator is present (e.g. standing) on platform 2 of the order picker.

In such embodiments, some of the above-described functions may be put on standby or otherwise not carried out when an operator is not present. This can allow that, for example, the base unit does not broadcast a visible signal, or, in particular, an audible signal, when an operator is not present. When it is determined that an operator is present, the functions may be fully enabled, e.g. with a suitable time delay if desired. By way of an exemplary illustration, a base unit of a fall-protection system of an order picker may be quiescent until such time as it is detected that an operator is present. At such time, the base unit may interrogate the sensor module or modules to obtain an indication of the condition of the connector. If the base unit directly receives an indication, or infers from an indication, that the connector does not appear to be attached to the D-ring of the operator's harness, the base unit may broadcast a notification (e.g. a visible "Not ready" signal and/or audible beeps, a steady audible signal, a repeated "Not ready" spoken recording, or the like). In particular embodiments, a suitable delay (e.g. 5, 10, or 15 seconds) may be built in to the system (particularly for any audible signal) to give the operator time to attach the connector to the harness without being subjected to e.g. an audible signal. At the end of this time delay, if e.g. a signal is received from a sensor module indicating that the connector is still e.g. docked or snugged against the SRL housing, and/or if a signal is not received from a sensor module indicating that the connector appears to be attached to the harness, the base unit may then broadcast any appropriate visual or audible notification (e.g. "Not ready"). Similarly, when the base unit receives an indication that the connector appears to have been detached from the harness, the system may allow a suitable, brief time delay that can allow the operator to e.g. dock the connector, exit the lift, and so on, without being subjected to e.g. an audible signal. If, after this time delay, the connector is not reported by a sensor as being docked (and/or if a proximity sensor indicates that the operator is still on the lift), the system may then issue a notification. It will be understood that many variations of such arrangements are possible.

Any suitable proximity sensor or sensors may be used. (The term proximity sensor is used in general to denote any sensor that can detect whether an operator is present on platform 2; the sensor does not necessarily have to provide a quantitative indication of actual distance.) In some embodiments, one or more ultrasonic proximity sensors may be used. In some embodiments, one or more force, pressure or load sensors may be installed in platform 2 so as to determines whether an operator is standing thereon. In some embodiments one or more infrared proximity sensors may be used. In some embodiments one or more radar proximity sensors may be used, e.g. a so-called radar chip operating at e.g. 24 GHz or 60 GHz. In some embodiments, one or more time-of-flight laser proximity sensors may be used, e.g. of the general type available from e.g. Digi-Key Electronics (for example, a STMicroelectronics VL53L1X sensor). In some particular embodiments, two such sensors may be used, mounted in the roof 9 of an order picker so as to monitor the entirety of platform 2 of the order picker. Any such proximity sensor or sensors may be e.g. hardwired to the base unit to receive power therefrom (alternatively, such a sensor could receive power directly from the electrical system of the order picker itself).

The base unit or units, the sensor module or modules, an operator-sensing sensor (e.g. a proximity sensor), and so on, can communicate in any desired manner Such communication may conveniently be wireless, whether by e.g. wi-fi, a wireless local area network, Bluetooth, Zigbee, or any suitable method or protocol. In various embodiments, the communication may be two-way or one-way, as desired. For example in some embodiments a sensor module may wirelessly transmit to the base unit, but not vice versa. In such embodiments a sensor module may, for example, take sensor readings e.g. at a predetermined schedule and transmit the results to the base unit. In some embodiments, the base unit may, whether on a predetermined schedule or in response to an event (e.g. upon a proximity sensor providing an indication that an operator has stepped onto a platform of an order picker), send an instruction to the sensor module to take a sensor reading and return the result to the base unit. The sensor module(s) and base unit(s) may be configured in the usual manner to perform an electronic handshake or the like, e.g. to ensure that (particularly in instances in which multiple aerial lifts operate in fairly close proximity) the base unit is communicating with the proper sensor module and vice versa.

In some embodiments the system may be configured so that if the connector is in a particular state (e.g. a Ready state) the sensor module will remain active rather than e.g. entering a low-power condition in which the communication module is off. This can provide, for example, that if a change to e.g. a Not ready state is detected, this change can be communicated to the base unit with minimum delay. Conversely, the system may be configured so that if the connector is in a Not ready state for a certain period of time (e.g. 30, 60, or 120 seconds), the sensor module will enter a low-power state e.g. in which the communication module is turned off. The sensor module may remain in this state until an interrupt signal is received from the second, gate sensor, in the manner discussed earlier herein, at which point the sensor module may exit the low-power state. Of course, if desired, in some embodiments the system may be configured so that the sensor module awakens from the low-power state periodically, e.g. on a predetermined schedule, in order to do a status check, systems check or the like.

In some embodiments the base unit may be configured to only broadcast a local notification (e.g. a visible signal and/or an audible signal). In some embodiments the base unit may be configured to provide a notification to a remote unit, e.g. to a smart phone or to a central hub at which the condition of numerous fall-protection systems and/or aerial lifts may be monitored. Such arrangements may make use of any desired communication method, protocol, or the like, including any of those mentioned above. Of course, in various embodiments, any of the conditions that are monitored by the herein-disclosed systems, may be e.g. logged, reported e.g. to a central hub or monitoring station for tracking purposes, and so on.

In some embodiments the monitoring system may comprise (e.g. in the base unit) an ability to track its physical location in generally horizontal directions, e.g. by well-known GPS methods or the like. Such capability may allow further modes of operation, e.g. in which the monitoring system can take action, issue notifications, and so on, depending on the physical location of the aerial lift and/or the fall-protection system. For example, if the system detects that the aerial lift and/or the fall-protection system appear to be in an area that was pre-designated as a "safe to unhook" area, the system may refrain from issuing any notification even if it detects that the connector does not appear to be connected to the harness. Conversely, the system may issue such a notification in an area that is designated e.g. "fall protection required". Such a system could also log the condition of the fall-protection system in concert with the physical location of the aerial lift, e.g. in order to track user behavior, enhance compliance with operating procedures, and so on.

In some embodiments, the monitoring system may be able to track the physical location of the fall-protection system (or any specific component thereof), and/or the physical location of at least the operator platform of an aerial lift, in the vertical direction. In other words, in some embodiments the monitoring system may comprise an additional sensor that is an altimeter configured to detect and monitor (directly, or indirectly) whether the operator appears to be at an elevated height above a surface such as a floor or ground. Thus in some embodiments, the monitoring system may comprise e.g. a LIDAR-based altimeter, a pressure-based altimeter, or the like. Any such altimeter need not necessarily be mounted on, or even near, the base unit as long as the altimeter is able to communicate with the base unit. Such a capability might be used instead of, or in addition to, any ability of the base unit to communicate with the aerial unit to directly ascertain, from the aerial lift itself, whether the operator platform is elevated.

In some embodiments, a fall-protection monitoring system as described herein may be a stand-alone entity (e.g. an add-on) to an aerial lift, with all such components of the monitoring system (in particular, the base unit thereof) operating independently of, and not communicating in any way with, the controls of the aerial lift. For example, in some embodiments a base unit that is mounted on an order picker may comprise its own power source (e.g. one or more batteries) rather than being hard-wired to the order picker, and/or may not communicate in any way with the order picker (or with a centralized hub that controls the order picker).

In some embodiments, the base unit may communicate to at least some extent with the aerial lift, e.g. for purposes of interlocking the operation of the aerial lift with the condition of the fall-protection system in any of various ways. By way of a specific example, in some embodiments an order picker may be configured so that it will not elevate from a lowered position, if the base unit of the fall-protection monitoring system sends a notification to the order picker that the connector is e.g. docked to a docking station, snugged against an SRL, or, in general if the connector appears to be in any condition other than attached to the harness of the operator. Conversely, the fall-protection system may be configured to not issue a notification (or to apply a time delay before issuing any notification) if the base unit receives an indication from the aerial lift that the operator platform is in its first, lowered position.

Many such variations of such approaches are possible. The viability of any such arrangements may depend on the configuration of the aerial lift and the fall-protection monitoring system; it will be understood that such arrangements may not necessarily be possible with any particular aerial lift. In particular embodiments, a base unit may be hard-wired to receive power from the aerial lift, but does not communicate with or otherwise interact with the aerial lift (i.e. the monitoring system may not necessarily be interlocked with the aerial lift).

As noted earlier, in some embodiments, when a connector is connected to a harness a base unit may broadcast an active notification (e.g. visible and/or audible) that indicates that the connector appears to have been connected to the harness. In other embodiments, when a connector is connected to a harness an active notification that was formerly present and that indicated that the connector was not connected to a harness, may merely disappear without necessarily being replaced by an active notification indicating that successful connection of the connector to a harness appears to have been achieved. The particular notification or notifications that are issued, in particular whether such notifications are active or passive, may depend e.g. on which item a sensor module or modules are installed on, how the sensor module or modules are configured to function, and so on, as discussed above in detail.

In some embodiments a Not ready status, when it first occurs, may trigger a first level of notification. For example, a visual indicator may glow constantly red. If the Not ready status continues for a certain time (e.g. thirty seconds), the visual indication may escalate e.g. to blinking red. If the Not ready status continues further, the indication may escalate still further (e.g. to brighter blinking lights, accompanied by an audible signal). On the other hand, a Ready status, when it first occurs, may trigger an initial notification (e.g. a green light) for a certain period of time, after which the notification may remain, or may be extinguished. In some embodiments, the base unit and notification unit may be configured to display various other signals, e.g. colored lights, patterns of movement or change in the lights, and so on, to correspond to various other conditions (e.g. initial systems-check upon start-up, absence of Bluetooth connection, low battery, etc.).

In particular embodiments in which a fall-protection system includes a docking station and in which the fall-protection monitoring system is able to sense whether the connector appears to be docked to the docking station, more complex scenarios may occur. For example, in the event that the connector appears to be neither docked nor attached to a harness D-ring, the base unit may be configured to display a very noticeable visual notification (e.g. a red and/or flashing "Undocked" or "Undocked/Not ready" notification), along with a loud or otherwise obtrusive audible notification. If the connector appears to be docked, the base unit may display a more neutral visible notification (e.g. a "Docked" or "Docked/Not ready" notification) and/or a different (e.g. less obtrusive) audible signal. If the connector appears to be attached to a harness D-ring, the base unit may display a green "Ready" signal and may cease broadcasting of any audible signals. It will be appreciated that the above scenarios are merely exemplary illustrations and that a wide variety of arrangements, choice of signals (e.g. color, wording of any text, character and loudness of any audible signals, and so on), etc. are possible.

In some embodiments, a sensor module of a fall-protection monitoring system may be configured with one or more sensors that are capable of detecting more than merely the presence or absence of an item or portion thereof. For example, a sensor that relies on inductive sensing may be configured to report more than simply the presence or absence of a signal above or below a certain threshold as indicative of the presence or absence of a metal item. By way of a particular illustration, such a sensor, as present on a connector, may be able to do more than simply report a yes/no indication of whether or not the connector appears to be attached to a detectable (e.g. metal) D-ring. Rather, the sensor may be able to provide an indication of whether the connector appears to be attached to a D-ring or appears to be attached to some other detectable item (such as e.g. a metal component of a docking station). Additionally, such a sensor may be able to distinguish both of these from a situation in which the connector does not appear to be attached to any detectable item.

In some embodiments, such arrangements may be enhanced by equipping one or more designated items with an add-on entity that is purposefully configured to alter the inductive signature of the item in a predetermined manner. For example, if a connector is equipped with a sensor that can detect, and distinguish between, multiple (i.e. three or more) inductive states, a D-ring may be equipped with an add-on entity that changes its inductive signature, while a docking station is not so equipped (or is equipped with a different add-on entity). Or, the arrangements could be reversed. Or, a dorsal D-ring of a harness could be equipped with a particular add-on entity, while any hip D-rings (if present) of the harness could be equipped with a different add-on entity, thus allowing the monitoring system to provide an indication of whether the connector appears to be attached to the dorsal D-ring or to a hip D-ring. Numerous variations of such approaches are possible, enabled by any suitable sensing mechanism.

With particular regard to inductive sensing, certain materials (e.g. ferrites) may be particularly suitable for purposes of altering the inductive signature of a metal item. Such materials may be, for example, disposed in a shroud, a wrap, a molded item, or the like, to form an add-on entity which may be e.g. mounted on or otherwise disposed on or near the metal item whose inductive signature is desired to be modified.

In some embodiments an inductive-signal-altering material (e.g. a ferrite wrap) may be used for shielding a metal component from a first, inductive sensor so that the ability of the sensor to detect some other metal component is enhanced. For example, in some embodiments a connector may take the form of a metal hook, with a molded plastic housing being fitted onto the hook. The herein-described sensor module (comprising e.g. a processor, at least one first, inductive sensor, at least one second, gate sensor, a communication module, and so on) may be positioned within the housing. In some embodiments a ferrite wrap or like material may be interposed between the body of the metal hook and the first sensor or sensors. In some embodiments, several such first sensors may be spaced around the "bowl" of the hook. In such a case, individual ferrite wraps may be wrapped around the portions of the metal hook that are closest to each sensor (alternatively, the entire length of the bowl may be wrapped with a single, suitable sized ferrite wrap). In some embodiments an inductive-signal-altering material may take the form of a material molded plastic part that is suitably sized and shaped to fit into the housing as desired and that is loaded with an additive such as e.g. ferrite. Any such arrangement can ensure that the presence of the hook itself does not interfere with the ability of the inductive sensor(s) to detect a metal item within the opening of the hook. Of course, in some embodiments a connector (e.g. a hook) may be comprised of a non-metallic material such as e.g. a carbon-fiber-reinforced (or inorganic-fiber-reinforced) engineering plastic with suitable properties. In such a case, such shielding may not be needed.

Although discussions herein have primarily concerned self-retracting lifelines, it will be understood that the arrangements and methods disclosed herein may be applicable to any fall-protection apparatus that is suitable for use with an aerial lift, e.g. an order picker. Such fall-protection apparatus may take the form of, for example, a lifeline that is in the form of a lanyard that is not necessarily extendable from, and retractable into, a housing in the manner of an SRL. Such lanyards may include the products often referred to as positioning lanyards. In particular embodiments, such lanyards may include at least one energy absorber (e.g. a tear strip or the like) configured to dissipate the energy in the event of a fall; such lanyards are often referred to as energy-absorbing lanyards. The arrangements and methods disclosed herein are thus understood to be applicable, in various embodiments, to any such lanyards and to all such fall-protection apparatus in general.

Although discussions here have primarily concerned order pickers, it is understood that the arrangements and methods disclosed herein may be applicable to any aerial lift. An aerial lift can be any powered (e.g. motorized) apparatus that comprises a platform (whether open-sided, partially open-sided, or closed-sided) that can be moved at least in a generally vertical direction. In some embodiments (e.g. if the aerial lift is a cherry-picker or bucket truck) the platform may be movable in a horizontal direction and/or an angled direction rather than being limited to purely vertical movement. In many embodiments the entire aerial lift may be able to move horizontally; e.g. it may comprise a main body (e.g. a vehicle) that, in addition to supporting the vertically elevatable platform, is motorized and is steerable in a horizontal direction.

In various embodiments, an aerial lift with which a fall-protection system and a fall-protection monitoring system as disclosed herein may be used, includes, in addition to the specific apparatus and categories already named, a so-called aerial work platform, a scissor lift, a reach truck (whether moving-carriage or moving-mast), a motorized narrow-aisle truck (e.g. an OSHA Class II powered industrial truck), and so on. Some such lifts as conventionally available may not necessarily be equipped with an overhead-installed fall protection apparatus (e.g. a self-retracting lifeline (SRL)). However, if it is desired that an SRL be used with such an aerial lift, the lift can be specially modified (e.g. equipped with a vertical mast of any suitable height, on which the SRL can be mounted) to allow this, as long as such modification is in compliance with all applicable laws, rules, codes, standards, and so on.

This application is a continuation of U.S. patent application Ser. No. 17/435,661 (published as U.S. Patent Application Publication No. US2022/0134149), now allowed, which was a national stage filing under 35 U.S.C. 371 of PCT Application No. PCT/IB2020/052398 (published as International Publication No. WO2020/194121), which claimed priority to U.S. Provisional Applications Nos. 62/822,457 and 62/978,024, the disclosures of all of which are incorporated by reference in their entirety herein.

It will be apparent to those skilled in the art that the specific exemplary elements, structures, features, details, configurations, etc., that are disclosed herein can be modified and/or combined in numerous embodiments. All such variations and combinations are contemplated by the inventor as being within the bounds of the conceived invention, not merely those representative designs that were chosen to serve as exemplary illustrations. Thus, the scope of the present invention should not be limited to the specific illustrative structures described herein, but rather extends at least to the structures described by the language of the claims, and the equivalents of those structures. Any of the elements that are positively recited in this specification as alternatives may be explicitly included in the claims or excluded from the claims, in any combination as desired. Any of the elements or combinations of elements that are recited in this specification in open-ended language (e.g., comprise and derivatives thereof), are considered to additionally be recited in closed-ended language (e.g., consist and derivatives thereof) and in partially closed-ended language (e.g., consist essentially, and derivatives thereof). To the extent that there is any conflict or discrepancy between this specification as written and the disclosure in any document that is incorporated by reference herein but to which no priority is claimed, this specification as written will control.

What is claimed is:

1. A fall-protection apparatus comprising a lifeline bearing a gated connector comprising a sensor module configured to sense a condition of the gated connector, the sensor module comprising:
   at least one first sensor that is an inductive sensor configured to detect whether a metal item is present within an opening of the gated connector; and,
   at least one second, gate sensor that is configured to determine whether the gate of the gated connector is in a secured or unsecured condition;
      wherein the sensor module is configured to maintain the first, inductive sensor in an inactive state and, if a signal is received from the second, gate sensor that a change in the condition of the gate has been detected, to activate the first, inductive sensor for a selected period of time;
      and,
      wherein the sensor module is configured so that if the second, gate sensor detects that the gate is secured, and if, during the selected period of time, the first, inductive sensor has detected a metal item within the opening of the gated connector, the sensor module issues a signal indicating a Ready condition of the gated connector.

2. The fall-protection apparatus of claim 1 wherein the at least one first, inductive sensor has a power consumption that is greater than a power consumption of the at least one second, gate sensor, by a factor of at least ten.

3. The fall-protection apparatus of claim 1 wherein the sensor module is partially or wholly encompassed within a molded plastic housing that is attached to the gated connector and wherein the sensor module is powered by a battery located within the molded plastic housing.

4. The fall-protection apparatus of claim 1 wherein the fall-protection apparatus comprises a lanyard.

5. The fall-protection apparatus of claim 1 wherein the fall-protection apparatus is a self-retracting lifeline (SRL).

6. The fall-protection apparatus of claim 5 wherein the self-retracting lifeline (SRL) comprises a housing that is attachable to an anchorage of an aerial lift, the housing comprising a drum to which a proximal end of the lifeline is attached, and wherein the gated connector is attached to a distal end of the lifeline of the self-retracting lifeline.

7. A fall-protection monitoring system comprising the fall-protection apparatus claim 1 and comprising a base unit configured to emit a first, Ready notification if the signal is received from the sensor module indicating the Ready condition of the gated connector; and, to emit a second, Not Ready notification if a second, different signal is received from the sensor module indicating a Not Ready condition of the gated connector.

8. The fall-protection monitoring system of claim 7, wherein the signal indicating the Ready condition of the gated connector is indicative that the gated connector is attached to a D-ring of a fall-protection safety harness of a user of the fall-protection monitoring system; and, wherein the second, different signal indicating the Not Ready condition of the gated connector, is indicative that the gated connector is not attached to the D-ring of the fall-protection safety harness of the user of the fall-protection monitoring system.

9. An aerial lift comprising the fall-protection monitoring system of claim 7 wherein the fall-protection apparatus is installed on the aerial lift.

10. The aerial lift of claim 9 wherein the fall-protection apparatus is a self-retracting lifeline that is secured to an anchorage located on a roof of the aerial lift.

11. The aerial lift of claim 9 wherein the base unit is mounted on the aerial lift and is configured to wirelessly receive signals from the sensor module.

12. The aerial lift of claim 11 wherein the base unit comprises a notification module and wherein the base unit is configured to emit the first, Ready notification or the second, Not Ready notification by instructing the notification module to issue the first, Ready notification or the second, Not Ready notification, and wherein the notification module is configured so that the first, Ready notification comprises a green visual signal, and is configured so that the second, Not Ready notification comprises a red visual signal.

13. The aerial lift of claim 12 wherein the fall-protection system comprises a proximity detector that is configured to detect that a user is present on the aerial lift and to communicate an indication to the base unit that the user is present on the aerial lift; and, wherein the base unit is configured so that if the base unit does not receive an indication from the proximity detector that the user is present on the aerial lift, the base unit will not instruct the notification module to issue the second, Not Ready notification.

14. The aerial lift of claim 9 wherein the aerial lift is configured so that operation of the aerial lift is interlocked with the fall-protection monitoring system so that the aerial lift will not elevate from a lowered position if the base unit of the fall-protection monitoring system sends, to the aerial lift, the second, Not Ready notification indicating that the gated connector appears to not be attached to a harness of a user of the aerial lift.

15. The fall-protection monitoring system of claim 7 wherein the base unit is co-located with the sensor module on the gated connector and is configured to receive signals from the sensor module non-wirelessly.

16. The fall-protection monitoring system of claim 15 wherein the sensor module and the base unit are partially or wholly encompassed within a molded plastic housing that is attached to the gated connector and are powered by a battery located within the molded plastic housing.

17. The fall-protection monitoring system of claim 16 wherein the base unit is configured to communicate wirelessly over a local area network.

18. The fall-protection monitoring system of claim 17 wherein the base unit is configured to provide the first, Ready and second, Not Ready notifications at least to a central hub at which multiple fall-protection systems of multiple aerial lifts are remotely monitored.

19. A method of monitoring the fall-protection apparatus of claim 1, the method comprising:
   sensing the condition of the gated connector and communicating a signal indicative of the condition of the gated connector to a base unit;
   and,
   emitting a notification of the condition of the gated connector based on the signal that is indicative of the condition of the gated connector.

20. The method of claim 19 wherein the fall-protection apparatus is installed on an aerial lift and wherein the sensing of the condition of the gated connector comprises sensing whether the gated connector is connected to a D-ring of a fall-protection safety harness of a user of the aerial lift.

21. The fall-protection apparatus of claim 1 wherein the gated connector is selected from the group consisting of carabiners and gated hooks.

* * * * *

UNITED STATES PATENT AND TRADEMARK OFFICE
CERTIFICATE OF CORRECTION

| | | |
|---|---|---|
| PATENT NO. | : 11,819,714 B2 | Page 1 of 1 |
| APPLICATION NO. | : 18/121815 | |
| DATED | : November 21, 2023 | |
| INVENTOR(S) | : Carlson et al. | |

It is certified that error appears in the above-identified patent and that said Letters Patent is hereby corrected as shown below:

In the Claims

Column 22
Line 5, In Claim 7, after "fall-protection apparatus", insert --of--.

Signed and Sealed this
Twenty-third Day of April, 2024

Katherine Kelly Vidal
*Director of the United States Patent and Trademark Office*